United States Patent Office 2,783,248
Patented Feb. 26, 1957

2,783,248

PROCESS FOR PREPARING DINAPHTHO-[2,1,1',2']-FURAN-5,6-DIONE

Gosta Brunnstrom, Somerville, N. J., assignor to American Cyanamid Company, New York, N. Y., a corporation of Maine No Drawing. Application June 30, 1954,
Serial No. 440,555

1 Claim. (Cl. 260—346.2)

This invention relates to dinaphtho-[2,1,1',2']-furan-5,6-dione of the formula

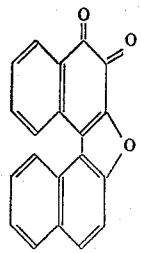

and to a process for producing the same.

The novel compound of the present invention is a useful coloring material. It is also a useful intermediate in the manufacture of dyes and pigments. The novel naphthoquinone derivative undergoes the usual reactions of quinones as well as being a useful reagent in the identification of ortho-diamines of the benzene, naphthalene and anthraquinone series by the formation of the corresponding azine derivative.

Dinaphtho-[2,1,1',2']-furan-5,6-dione is prepared by reacting beta-naphthol with an alkali metal or alkaline earth metal hydroxide and heating in the presence of air at a temperature of at least 50° C. and preferably of the order of 60° to 70° C. When the reaction is complete the novel compound is isolated from the reaction mixture in the usual way by appropriate extraction procedures followed by crystallization from toluene.

Various alkali metal and alkaline earth metal hydroxides are operable in the present reaction including sodium, potassium, calcium, barium hydroxides, etc. In general, the use of sodium hydroxide is preferred.

The quantity of hydroxide employed should be from about one-half to three-fourths of the stoichiometric amount with the best yields being obtainable with about one-half of the stoichiometric quantity.

As is true with many reactions involving organic compounds, the reaction proceeds rather slowly. In order to speed up the reaction, therefore, it has been found helpful to use the beta-naphthol in powdered form.

The mechanism of the reaction is not too well understood but it is believed that it proceeds by oxidation of the beta-naphthol by the oxygen in the air and subsequent ring closure to form the novel naphthoquinone derivative. At any rate, it is not desired to limit the process by which the compound is produced to any particular theory of reaction.

It is a surprising feature of the present reaction that it does not result in the more extensive formation of ordinary binaphthols. The usual oxidation procedures of beta-naphthol result in either binaphthols or under more vigorous oxidizing conditions, rupture of the naphthalene ring takes place. In the present reaction, the naphthalene ring remains intact under the hereindescribed oxidizing conditions. Obviously, however, it is possible at elevated temperatures to decompose the beta-naphthol. Therefore, the upper practical limit on the temperature of the reaction is set as being below that at which decomposition of the beta-naphthol occurs.

The invention will be described in greater detail in conjunction with the following specific examples in which the parts are by weight unless otherwise specified.

*Example 1*

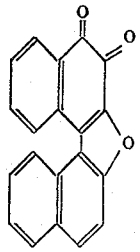

720 parts of beta-naphthol are finely ground and are intimately mixed with 100 parts of sodium hydroxide. The mixture is heated exposed to the atmosphere at 60 to 70° C., at which temperature the mixture partially melts. During the heating period, the mixture is agitated. To facilitate agitation, the mixture is cooled and the solid which forms is reground and again heated. This is continued at intervals until the dark mass no longer partially melts when heated to the 60 to 70° C. temperature. The mass is then finally ground and stirred with 100 parts of sodium hydroxide dissolved in 3000 parts of water. The sodium salt which forms is removed by filtration and is decomposed in ethanol by the addition of concentrated hydrochloric acid, liberating the free naphthoquinone derivative. At a pH of 2 to 3, the precipitation of the free naphthoquinone derivative is substantially complete. The crude product is removed by filtration and is purified by washing with hot ethanol and by recrystallization from toluene. The yield of the crude product is approximately 20% based on the beta-naphthol. The purified product crystallizes in brown needles which melt at 253–254° C. When dissolved in concentrated sulfuric acid, it gives a deep blue solution. It is only slightly soluble in the common solvents.

*Example 2*

The procedure of Example 1 is followed except that an equivalent amount of barium hydroxide is used. The same product is obtained.

I claim:

The process of preparing dinaphtho-[2,1,1',2']-furan-5,6-dione which comprises heating beta-naphthol to between about 50° C. and 70° C. under substantially anhydrous conditions in the presence of between about one-half and three-fourths of the stoichiometric amount of a compound selected from the group consisting of alkali metal and alkaline earth metal hydroxides and in the presence of oxygen.

References Cited in the file of this patent

UNITED STATES PATENTS 2,077,548    Clemo et al. _____ Apr. 20, 1937

OTHER REFERENCES

Clemo et al.: J. Chem. Soc., 1928, pp.2811–19.
Hofmann et al.: Chem. Abst., vol. 26, p. 4589 (1932).
Smith's Inorganic Chem., 2nd revised ed., p. 234, D. Appleton-Century Co., N. Y. (1937).